United States Patent
Evans et al.

(10) Patent No.: US 12,344,215 B2
(45) Date of Patent: Jul. 1, 2025

(54) SYSTEM AND METHOD FOR AUTOMATICALLY DETECTING A DRAGGING BRAKE

(71) Applicant: FORD GLOBAL TECHNOLOGIES, LLC, Dearborn, MI (US)

(72) Inventors: Charles K Evans, Willis, MI (US); John C. Cerone, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 88 days.

(21) Appl. No.: 18/231,011

(22) Filed: Aug. 7, 2023

(65) Prior Publication Data

US 2025/0050860 A1    Feb. 13, 2025

(51) Int. Cl.
 *B60T 17/22*    (2006.01)
(52) U.S. Cl.
 CPC ......... *B60T 17/221* (2013.01); *B60T 2210/30* (2013.01); *B60T 2270/406* (2013.01)
(58) Field of Classification Search
 CPC .................................................. B60T 17/221
 See application file for complete search history.

(56) References Cited

U.S. PATENT DOCUMENTS

| | | | |
|---|---|---|---|
| 4,824,260 A * | 4/1989 | Novotny | F16D 66/00 188/1.11 R |
| 5,651,431 A | 7/1997 | Kyrtsos | |
| 7,009,508 B2 | 3/2006 | Vertenten | |
| 7,011,186 B2 | 3/2006 | Frentz et al. | |
| 7,712,588 B2 | 5/2010 | Caron | |
| 8,326,509 B2 | 12/2012 | Logan et al. | |
| 11,047,438 B2 | 6/2021 | Zuhlsdorf | |
| 11,261,930 B2 * | 3/2022 | Cremona | B60T 17/22 |
| 2019/0009769 A1 * | 1/2019 | Antanaitis | B60W 30/00 |
| 2021/0197787 A1 | 7/2021 | Baehrle-Miller et al. | |
| 2021/0237708 A1 * | 8/2021 | Franzini | B60T 17/221 |

FOREIGN PATENT DOCUMENTS

| | | |
|---|---|---|
| CN | 109591783 A | 4/2019 |
| CN | 107667046 B | 6/2021 |
| EP | 4112402 A1 | 1/2023 |
| GB | 2557195 A | 6/2018 |
| JP | 5137919 B2 | 2/2013 |
| KR | 19980053239 U | 10/1998 |
| KR | 19990021075 U | 6/1999 |

(Continued)

*Primary Examiner* — Sizo B Vilakazi (74) *Attorney, Agent, or Firm* — Burr & Forman LLP; Lorne Forsythe (57) ABSTRACT

A monitoring system for a brake assembly of a vehicle may include a temperature sensor disposed proximate to the brake assembly to measure an actual temperature of the brake assembly, a controller operably coupled to the temperature sensor and comprising a thermal model, the controller being configured to determine a predicted temperature of the brake assembly using the thermal model, and a user interface operably coupled to the controller to provide a notification to an operator of the vehicle. The controller may compare the actual temperature to the predicted temperature and may automatically generate the notification responsive to the actual temperature exceeding the predicted temperature by a threshold amount.

20 Claims, 4 Drawing Sheets

(56) References Cited

FOREIGN PATENT DOCUMENTS

| | | | |
|---|---|---|---|
| KR | 2020000002501 | U | 2/2000 |
| KR | 102534552 | B1 | 5/2023 |
| WO | 9829672 | A1 | 7/1998 |
| WO | 9904179 | A1 | 1/1999 |
| WO | 02076800 | A1 | 10/2002 |
| WO | 2004102031 | A1 | 11/2004 |
| WO | 2018099864 | A1 | 6/2018 |

* cited by examiner

SYSTEM AND METHOD FOR AUTOMATICALLY DETECTING A DRAGGING BRAKE

TECHNICAL FIELD

Example embodiments generally relate to vehicle control and monitoring systems and, more particularly, relate to a system for automatically detecting a dragging brake.

BACKGROUND

Electrically actuated brakes currently exist in trailer drum brake applications, and in various parking brake applications where signals are sent to either an electromagnet or a direct current (DC) motor actuator to control the amount of brake torque to be applied. Similar brake systems are being offered as an option by automotive brake system suppliers, thereby replacing the hydraulically actuated brake systems that are common today.

As this technological migration occurs, it may be desirable to develop better ways of monitoring brake system components.

BRIEF SUMMARY OF SOME EXAMPLES

In accordance with an example embodiment, a monitoring system for a brake assembly of a vehicle may therefore be provided. The system may include a temperature sensor disposed proximate to the brake assembly to measure an actual temperature of the brake assembly, a controller operably coupled to the temperature sensor and comprising a thermal model, the controller being configured to determine a predicted temperature of the brake assembly using the thermal model, and a user interface operably coupled to the controller to provide a notification to an operator of the vehicle. The controller may compare the actual temperature to the predicted temperature and may automatically generate the notification responsive to the actual temperature exceeding the predicted temperature by a threshold amount.

In another example embodiment, a method of automatically monitoring a brake assembly of a vehicle may also be provided. The method may include receiving an actual temperature of the brake assembly from a temperature sensor, determining a predicted temperature of the brake assembly via a controller using a thermal model, comparing the actual temperature to the predicted temperature, and automatically generating a notification to an operator via a user interface responsive to the actual temperature exceeding the predicted temperature by a threshold amount.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Figure 1:
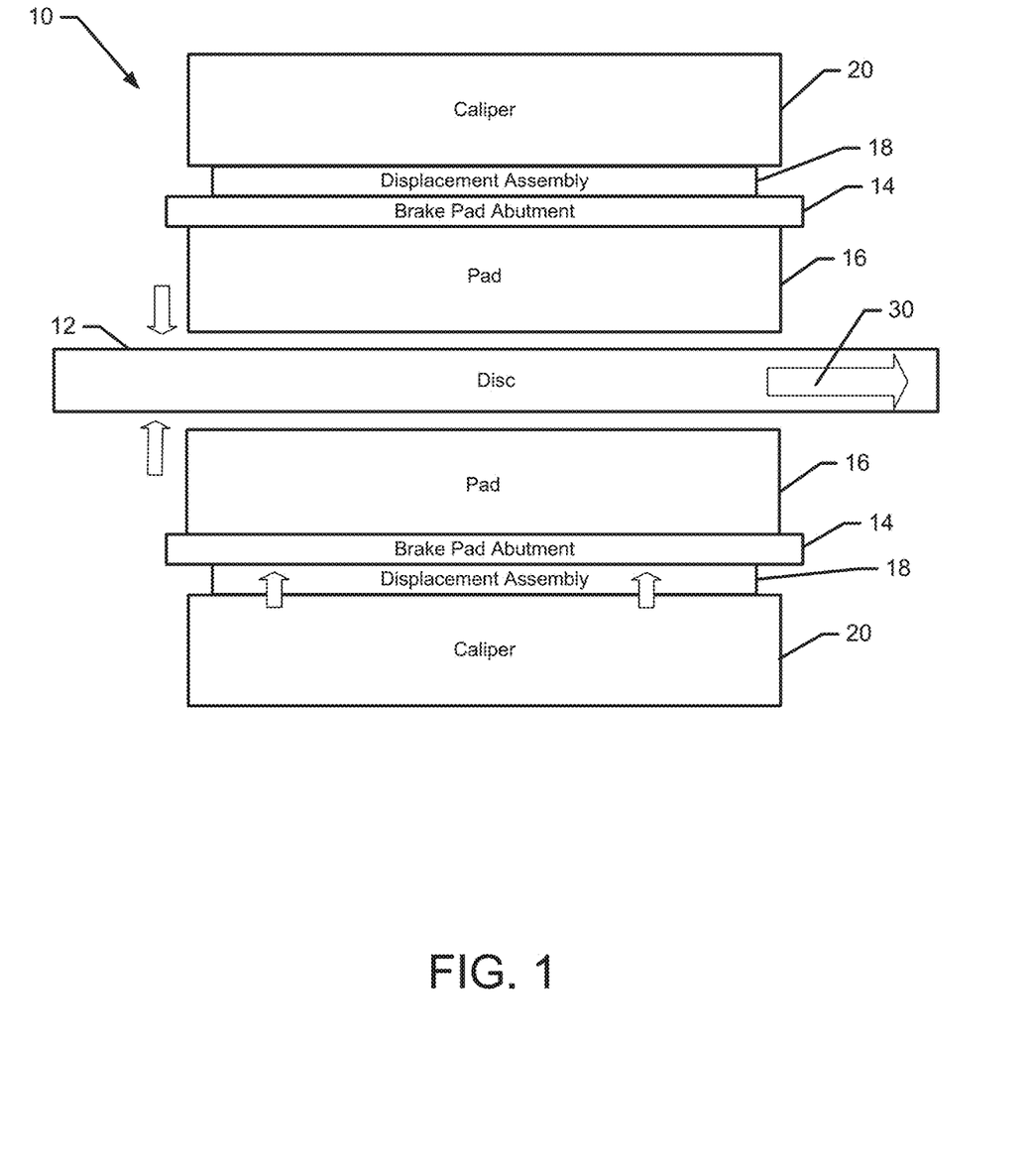
FIG. 1 illustrates a block diagram of a brake assembly of a vehicle.

One issue that arises in the context of brake applications (and particularly in the context of performance brake applications) is the unintentional dragging of one or more brakes. In this regard, FIG. 1 illustrates a brake assembly 10 including a rotor or disc 12 that rotates with a respective wheel of the vehicle, a brake pad abutment 14, a brake pad 16, a displacement assembly 18 (e.g. a piston assembly, magnet assembly, motor assembly, or the like), and a caliper 20, which houses the brake pad 16 and the displacement assembly 18. The disc 12 rotates, for example, in the direction of arrow 30 and therefore when the displacement assembly 18 is actuated, responsive to operation of a brake pedal by an operator, to push the brake pad abutment 14 toward the disc 12, the contact between the brake pad 16 and the disc 12 imposes a force on the disc 12 that opposes the direction of rotation in arrow 30. Thus, the act of applying the force from the brake pads 16 onto the disc 12 may be referred to as applying braking torque, which may slow down the rotation of the disc 12 and wheel accordingly.

Responsive to the operator releasing the brake pedal, the displacement assembly 18 may disengage and move away from the disc 12, thereby releasing the brake pad 16 from contact with the disc 12 and allowing it to rotate freely once again. However, in some cases, the brake pad 16 may remain in contact with the disc 12 despite the brake pedal having been released, for whatever reason. In some cases, a variety of reasons and factors may keep the displacement assembly 18 activated after it should be released, or may keep the brake pad 16 otherwise in contact with the disc 12. Regardless, a brake pad 16 that may remain in contact with the disc 12 after the brake pedal has been released by the operator may be referred to as a dragging brake. As the vehicle continues to operate, the dragging brake may exert a force on the disc 12 as the disc 12 rotates even when the brake assembly 10 may not be intentionally actuated. This may cause the vehicle to operate less efficiently and, among other things, cause the brake assembly 10 to generate excessive heat as a result of the friction between the brake pad 16 and the disc 12. A dragging brake pad 16 may often be difficult for the operator of the vehicle to detect, and depending on a variety of factors with regards to the vehicle and the dragging brake, the operator may or may not be aware of the dragging brake. Thus, it may be desirable to design and implement a monitoring system for the brake assembly 10 that will automatically notify the operator when a dragging brake is detected.

Figure 2:
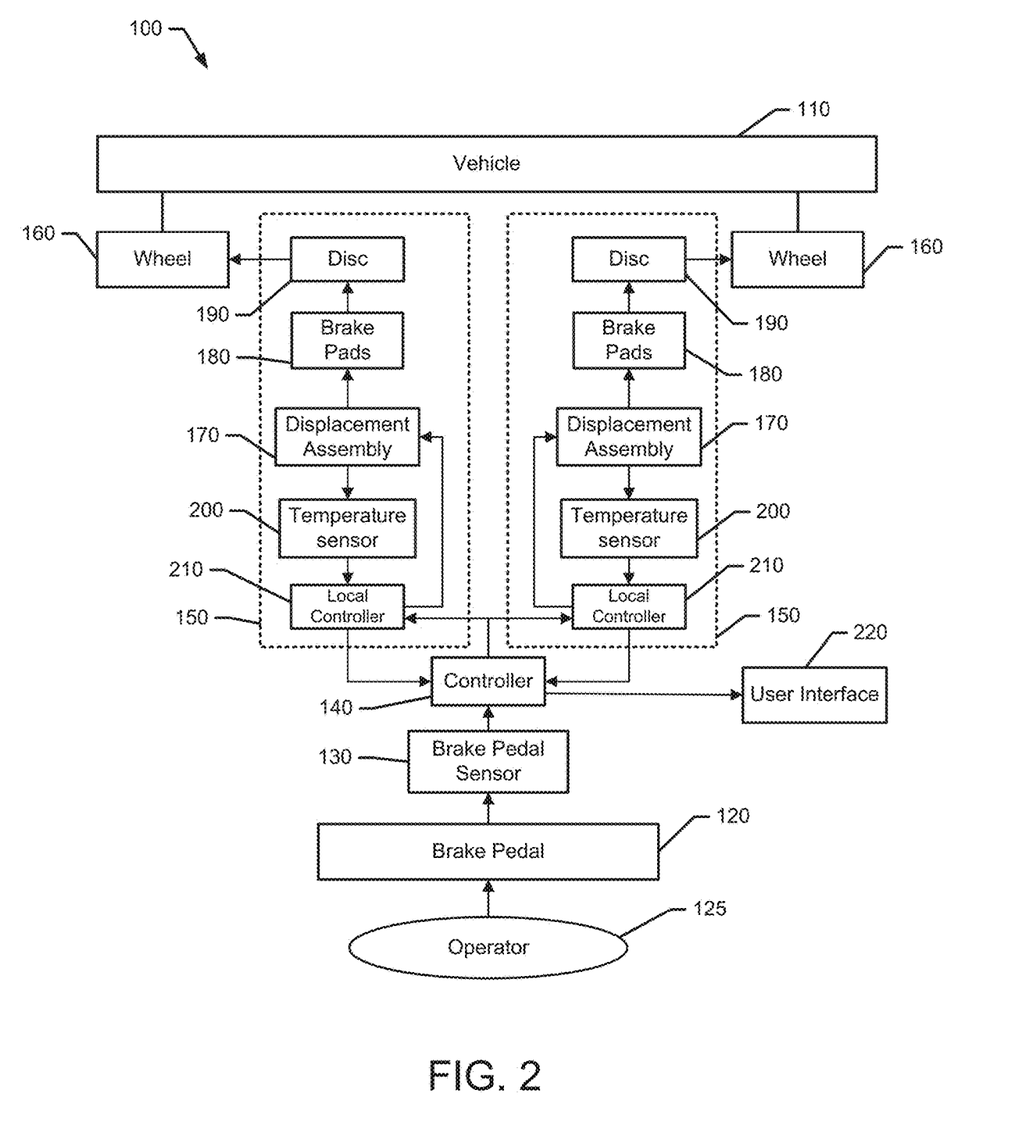
FIG. 2 illustrates a block diagram of a brake assembly monitoring system in accordance with an example embodiment.

FIG. 2 illustrates a block diagram of a brake assembly monitoring system 100 of an example embodiment. The components of the monitoring system 100 may be incorporated into a vehicle 110 (e.g., via being operably coupled to a chassis of the vehicle 110, various components of the vehicle 110 and/or electronic control systems of the vehicle 110). Of note, although the components of FIG. 2 may be operably coupled to the vehicle 110, it should be appreciated that such connection may be either direct or indirect. Moreover, some of the components of the control system 100 may be connected to the vehicle 110 via intermediate connections to other components either of the chassis or of other electronic and/or mechanical systems or components.

The brake assembly monitoring system 100 may be operably coupled to a vehicle control system which may include one or more input devices in the form of one or more control pedals. In some embodiments, the control pedals may include a brake pedal 120. However, the control pedals could alternatively be hand operated or any other operable member via which an operator 125 may provide an input indicative of an intent of the operator 125 relative to controlling net torque for application to the wheels of the vehicle 110. The control system 100 may also include a position sensor for the brake pedal 120 in the form of a corresponding brake pedal sensor 130. In an example embodiment, the brake pedal sensor 130 may be a brake pedal position sensor. The brake pedal sensor 130 may thus provide a signal as an output, and the signal may be indicative of the precise position of the brake pedal 120 relative to a range of motion of the brake pedal 120. In some other cases, the brake pedal sensor 130 may be a brake pedal angle sensor. In this regard, the brake pedal sensor 130 may provide a signal as an output that may be indicative of the precise angle of the brake pedal 120, relative to a reference angle of the brake pedal 120 or to a range of angles of the brake pedal 120. In any case, the signal from the brake pedal sensor 130 may be communicated to a controller 140. The controller 140 may be a component in both the vehicle control system of the vehicle 110 as well as in the brake assembly monitoring system 100. Therefore, the controller 140 may be configured to perform other tasks that may or may not be related to propulsive and braking control or performance management.

In an example embodiment, the controller 140 may receive information from various components or subassemblies of the vehicle 110, such as the signal from the brake pedal sensor 130, that may be used to determine vehicle status. Additionally or alternatively, various sensors that may be operably coupled to the components or subassemblies may be included, and may provide input to the controller 140 that is used in determining vehicle status. Such sensors may be part of a sensor network and sensors of the sensor network may be operably coupled to the controller 140 (and/or the components or subassemblies) via a vehicle communication bus (e.g., a controller area network (CAN) bus). One such component or subassembly that may be operably coupled to the controller 140 may be a brake assembly 150, or a plurality of brake assemblies 150.

The controller 140 may be operably coupled to the brake assembly 150, or to the plurality of brake assemblies 150 of the vehicle 110 via the CAN bus. In an example embodiment, the vehicle 110 may include one brake assembly 150 per wheel 160 of the vehicle 110. In the embodiment depicted in FIG. 2, two brake assemblies 150 may be shown simply for illustrative purposes, but also to illustrate how the monitoring system 100 may monitor more than one brake assembly 150 simultaneously. However, it should be noted that in many cases, the vehicle 110 may have more than two wheels 160, and may thus also have more than two brake assemblies 150.

The brake assembly 150 of some embodiments may include a displacement assembly 170, brake pads 180, a disc 190 (or rotor), a temperature sensor 200, and a local controller 210 which may be disposed at the brake assembly 150. The local controller 210, responsive to receiving the signal from the brake pedal sensor 130 via the controller 140, may provide an output signal to the displacement assembly 170 corresponding to an amount of brake torque to apply to the wheel 160 via the brake pads 180 and the disc 190. As described above in reference to FIG. 1, the brake torque may be applied to the wheel 160 via contact between the brake pads 180 and the disc 190 generating braking torque due to the force of friction between the brake pads 180 and the disc 190. The amount of braking torque applied to the wheel 160 may be the result of the pressure applied on the brake pads 180 from the displacement assembly 170, which may be activated accordingly by the signal from the local controller 210. In some cases the displacement assembly 170 may include a hydraulic assembly for applying pressure onto the disc 190 via the brake pads 180. Such cases may utilize a piston assembly as the displacement assembly 170. In some other cases, the brakes may be electromagnetic brakes, in which case the displacement assembly 170 may include a magnet used to apply pressure onto the disc 190 via the brake pads 180. In an example embodiment, the brakes of the vehicle 110 may be electro-mechanical. In such cases, the displacement assembly 170 may include a motor or actuator configured to displace the brake pads 180 to apply pressure onto the disc 190 accordingly. Other displacement assembly 170 mechanisms may also be possible for displacing the brake pads 180 accordingly, and thus the above mentioned examples do not constitute an exhaustive list of possibilities.

Responsive to the brake assembly 150 applying braking torque, the brake assembly 150 may generate heat as a byproduct of the friction force between the brake pads 180 and the disc 190. Thus, in order to monitor the brake assembly 150 to prevent operation under excessive temperature conditions, the brake assembly 150 of some example embodiments may include the temperature sensor 200. Often, the temperature sensor 200 may be disposed proximate to, or otherwise operably coupled to, the displacement assembly 170. In such cases, the temperature sensor 200 may monitor the temperature of the displacement assembly 170 to ensure the displacement assembly 170 does not overheat to the point of damaging any essential components of the displacement assembly 170 that may be involved in physically actuating the brake pads 180 (e.g. motor(s), piston(s), magnet(s), etc.). In some cases, the temperature sensor 200 may be operably coupled to the local controller 210 and may communicate a signal corresponding to the actual temperature of the displacement assembly 170 to the local controller 210, and perhaps to the controller 140. In the event that excessive temperature conditions are detected, the local controller 210 and/or the controller 140 may take preventative measures to reduce the temperature of the brake assembly 150 as a whole. In an example embodiment, the temperature sensor 200 may be a thermocouple. In some cases, the excessive temperature conditions for the displacement assembly 170 may include detecting temperatures in excess of about 140° C. to 160° C. In some other cases, the excessive temperature conditions for the displacement assembly 170 may include detecting temperatures in excess of 150° C.

The temperature sensor 200 of some embodiments may also be utilized to detect the presence of a dragging brake, and notify the operator 125 accordingly, via the local controller 210, the controller 140 and a user interface 220. In this regard, as stated above, a dragging brake may generate excess heat as a result of the friction force between the brake pads 180 and the disc 190. The amount of heat generated from a dragging brake may vary from case to case depending on a combination of factors including, but not limited to, the amount of braking torque applied by the dragging brake, the duration of time for which the brake may have been dragging, an ambient air temperature outside the vehicle, among others. Therefore, detecting a dragging brake using the temperature sensor 200 may not be accomplished by simply comparing the temperature of the brake assembly 150 to a predetermined temperature value, such as the method described above for monitoring the displacement assembly 170. Rather, the monitoring assembly 100 may predict what the temperature of the brake assembly 150 should be based on a number of factors including how much braking torque is generated over a certain amount of time. The monitoring assembly 100 will be discussed in detail accordingly with regards to FIG. 3 below.

Figure 3:
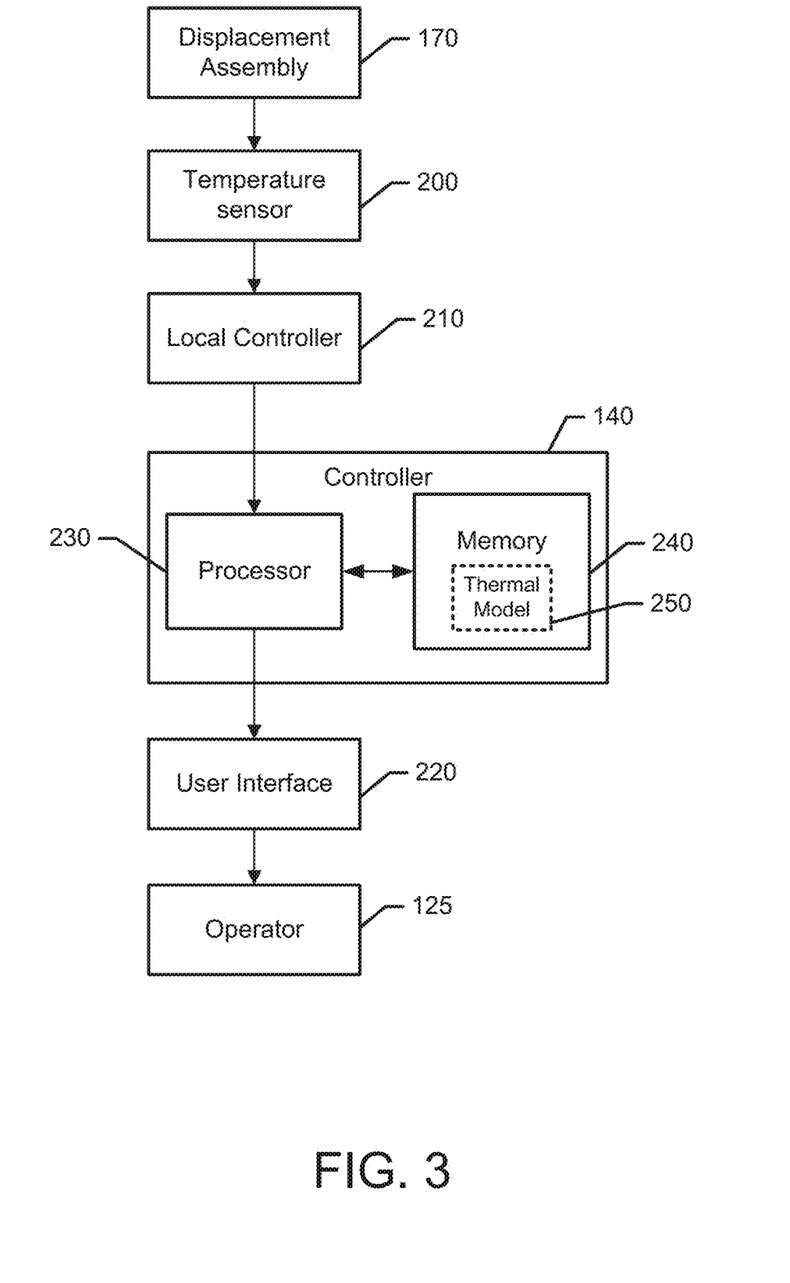
FIG. 3 illustrates a block diagram of some components of a brake assembly monitoring system in accordance with an example embodiment.

FIG. 3 depicts a closer view, via a block diagram, of the brake assembly monitoring system 100 from FIG. 2. As shown in FIG. 3, the temperature sensor 200 may measure an actual temperature of the brake assembly 150. In some cases, the actual temperature of the brake assembly 150 may be the temperature of the brake pads 180. In another example embodiment, the actual temperature may correspond to the temperature of the displacement assembly 170, similar to the above mentioned method for monitoring the displacement assembly 170. In such examples, the actual temperature recorded by the temperature sensor 200 may be used in both monitoring the displacement assembly 170 and in detecting a dragging brake. Regardless, the temperature sensor 200 may communicate the actual temperature to the controller 140 via the local controller 210 and the CAN bus. Processing circuitry (e.g., a processor 230 and memory 240) at the controller 140 may process the signal received from the temperature sensor 200 by running one or more control algorithms. The control algorithms may include instructions that can be stored by the memory 240 for retrieval and execution by the processor 230. In some cases, the memory 240 may further store one or more tables (e.g., look up tables) and various calculations and/or applications may be executed using information in the tables and/or the information as described herein.

In an example embodiment, the memory 240 may include a thermal model 250. The thermal model 250 may define a relationship between an amount of brake torque applied to the wheel 160 and an amount of heat generated by the brake assembly 150 (i.e. temperature of the brake assembly 150) as a result of applying said brake torque. In other words, the thermal model 250 may be an algorithm or program that the controller 140 may use to determine a predicted (e.g. expected) temperature of the brake assembly 150 based on the operation of the brakes and the ambient temperature, among other factors. In this regard, the controller 140 may continuously calculate what the predicted temperature of the brake assembly 150 may be, using the thermal model 250, as the vehicle 110 operates. The predicted temperature of some embodiments may accordingly be based on brake torque, time and an ambient air temperature outside the vehicle 110. Thus, for example, the controller 140 may constantly update the predicted temperature of the brake assembly 150 using the thermal model 250 as the brake assembly 150 may be used, for how long it may be used, how hard it may be used, and under what environmental conditions it may be used. Simultaneously, the processor 230 of the controller 140 may compare the actual temperature of the brake assembly 150 from the temperature sensor 200 to the predicted temperature of the brake assembly 150 derived from the thermal model 250. The controller 140 may automatically generate a notification for the operator 125 at the user interface 220 to indicate the presence of a dragging brake responsive to the actual temperature exceeding the predicted temperature by a threshold amount. In some cases, the notification may indicate which particular brake assembly 150 of the vehicle 110 may include the dragging brake. In an example embodiment, the notification may also include a recommendation to have the vehicle 110 serviced as soon as feasible. In some cases, the threshold amount may be between about 5° C. and about 15° C. In some other cases, the threshold amount may be about 10° C.

In an example embodiment, the user interface 220 may be a display which may be disposed within the vehicle 110 such as at a dashboard, gauge cluster, entertainment unit or other component of the vehicle 110. In some cases, the notification may remain displayed at the user interface 220 for as long as the actual temperature exceeds the predicted temperature by the threshold amount, and may accordingly be removed responsive to the difference between the actual temperature and the predicted temperature falling back below the threshold amount. In some other cases, the notification may remain displayed after the difference between the actual temperature and the predicted temperature falls below the threshold amount, and may perhaps remain displayed until the notification is cleared either by the operator 125 or by a technician servicing the vehicle 110. In an example embodiment, the user interface 220 may be a display disposed remotely with respect to the vehicle 110. In such cases, the controller 140 may be operably coupled to a wireless communications module of the vehicle 110 which may be configured to allow the controller 140 to communicate with the operator 125 via the internet. In other words, the user interface 220 may be a personal electronic device of the operator 125 such as, but not limited to, a laptop computer, a tablet, a smartphone, and a smart watch device, among others. Thus, the operator 125 may be notified of the dragging brake via the remote user interface 220, perhaps even after the vehicle 110 is powered off and parked, regardless of the operator's 125 proximity to the vehicle 110.

Notably, although examples described above primarily relate to disc brakes, similar concepts could also be employed with respect to drum brakes where the movement of brake shoes may be radially inward and outward instead of being inward and outward in an axial direction (parallel to the axis of the rotor or disc), which is employed for disc brakes with brake pads. Additionally, the monitoring system 100 could be applied in embodiments where the brake assembly 150 may be an electro-mechanical brake assembly, a hydraulic brake assembly, an electromagnetic brake assembly, or any other form of brake assembly 150.

Figure 4:
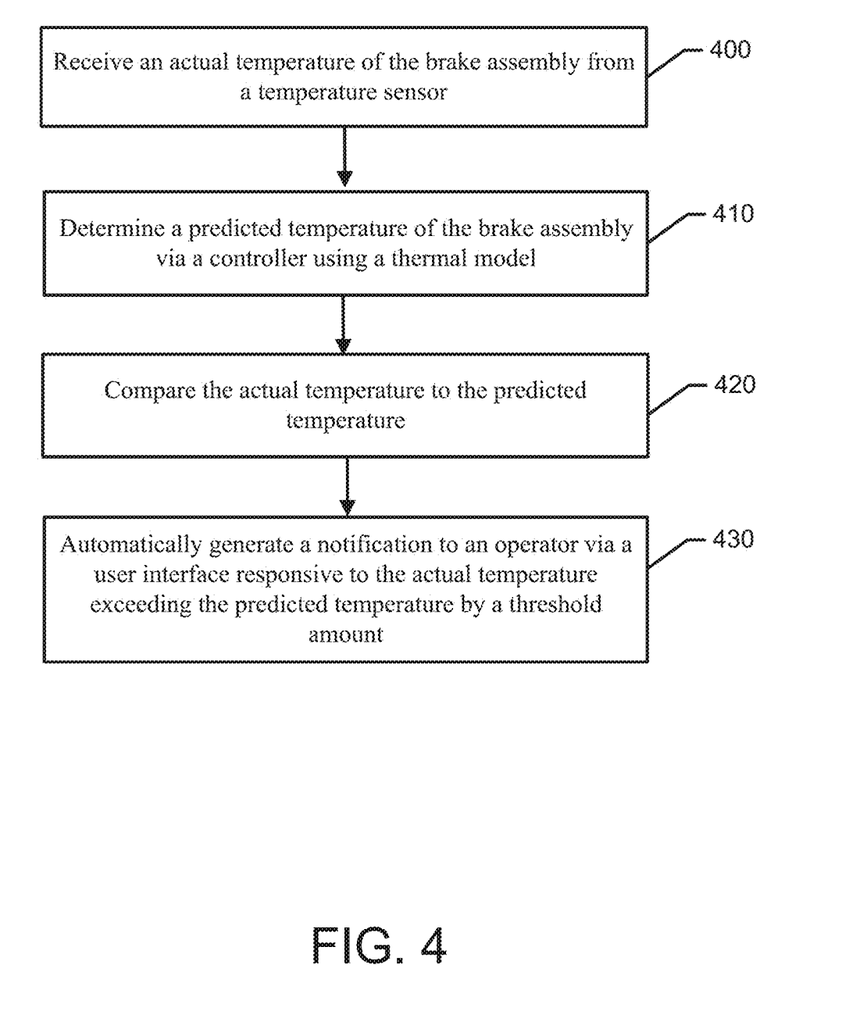
FIG. 4 illustrates a block diagram of various processes associated with performing a method of automatically monitoring a brake assembly in accordance with an example embodiment.

FIG. 4 illustrates a block diagram of one example method of providing automated monitoring of a brake assembly 150. The method may include receiving an actual temperature of the brake assembly from a temperature sensor at operation 400. The method may further include determining a predicted temperature of the brake assembly 150 via a controller 140 using a thermal model 250 at operation 410, and comparing the actual temperature to the predicted temperature at operation 420. In response to the actual temperature exceeding the predicted temperature by a threshold amount, the method may include automatically generating a notification to an operator via a user interface at operation 430.

A monitoring system for a brake assembly of a vehicle may therefore be provided. The system may include a temperature sensor disposed proximate to the brake assembly to measure an actual temperature of the brake assembly, a controller operably coupled to the temperature sensor and comprising a thermal model, the controller being configured to determine a predicted temperature of the brake assembly using the thermal model, and a user interface operably coupled to the controller to provide a notification to an operator of the vehicle. The controller may compare the actual temperature to the predicted temperature and may automatically generate the notification responsive to the actual temperature exceeding the predicted temperature by a threshold amount.

The monitoring system of some embodiments may include additional features, modifications, augmentations and/or the like to achieve further objectives or enhance performance of the monitoring system. The additional features, modifications, augmentations and/or the like may be added in any combination with each other. Below is a list of various additional features, modifications, and augmentations that can each be added individually or in any combination with each other. For example, the controller may determine the predicted temperature of the brake assembly as a function of brake torque, time and an ambient air temperature outside the vehicle. In an example embodiment, the controller may continuously determine the predicted temperature of the brake assembly as the vehicle may operate. In some cases, the notification may indicate to the operator that at least one brake may be dragging. In an example embodiment, the notification may remain displayed as long as the actual temperature exceeds the predicted temperature by the threshold amount. In some cases, the notification may remain displayed after the difference between the actual temperature and the predicted temperature falls below the threshold amount. In an example embodiment, the threshold amount may be 10° C. In some cases, the temperature sensor may be a thermocouple. In an example embodiment, the brake assembly may be an electro-mechanical brake assembly. In some cases, the user interface may be a display disposed in the vehicle. In an example embodiment, the user interface may be a display disposed at a personal electronic device of the operator.

A method of automatically monitoring a brake assembly of a vehicle may also be provided. The method may include receiving an actual temperature of the brake assembly from a temperature sensor, determining a predicted temperature of the brake assembly via a controller using a thermal model, comparing the actual temperature to the predicted temperature, and automatically generating a notification to an operator via a user interface responsive to the actual temperature exceeding the predicted temperature by a threshold amount.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A monitoring system for a brake assembly of a vehicle, the system comprising:
   a temperature sensor disposed proximate to the brake assembly to measure an actual temperature of the brake assembly;
   a controller operably coupled to the temperature sensor and comprising a thermal model, the controller being configured to determine a predicted temperature of the brake assembly using the thermal model; and
   a user interface operably coupled to the controller to provide a notification to an operator of the vehicle,
   wherein the controller is configured to compare the actual temperature to the predicted temperature and is also configured to automatically generate the notification responsive to the actual temperature exceeding the predicted temperature by a threshold amount.

2. The monitoring system of claim 1, wherein the controller determines the predicted temperature of the brake assembly as a function of brake torque, time and an ambient air temperature outside the vehicle.

3. The monitoring system of claim 1, wherein the controller continuously determines the predicted temperature of the brake assembly as the vehicle operates.

4. The monitoring system of claim 1, wherein the notification indicates to the operator that at least one brake is dragging.

5. The monitoring system of claim 4, wherein the notification remains displayed as long as the actual temperature exceeds the predicted temperature by the threshold amount.

6. The monitoring system of claim 4, wherein the notification remains displayed after the difference between the actual temperature and the predicted temperature falls below the threshold amount.

7. The monitoring system of claim 1, wherein the threshold amount is 10° C.

8. The monitoring system of claim 1, wherein the temperature sensor is a thermocouple.

9. The monitoring system of claim 1, wherein the brake assembly is an electro-mechanical brake assembly.

10. The monitoring system of claim 1, wherein the user interface is a display disposed in the vehicle.

11. The monitoring system of claim 1, wherein the user interface is a display disposed at a personal electronic device of the operator.

12. A method of automatically monitoring a brake assembly of a vehicle, the method comprising:

receiving an actual temperature of the brake assembly from a temperature sensor;

determining a predicted temperature of the brake assembly via a controller using a thermal model;

comparing the actual temperature to the predicted temperature; and automatically generating a notification to an operator via a user interface responsive to the actual temperature exceeding the predicted temperature by a threshold amount.

13. The method of claim 12, wherein the controller determines the predicted temperature of the brake assembly as a function of brake torque, time and an ambient air temperature outside the vehicle.

14. The method of claim 12, wherein the controller continuously determines the predicted temperature of the brake assembly as the vehicle operates.

15. The method of claim 12, wherein the notification indicates to the operator that at least one brake is dragging.

16. The method of claim 15, wherein the notification remains activated for as long as the actual temperature exceeds the predicted temperature by the threshold amount.

17. The method of claim 15, wherein the notification remains displayed after the difference between the actual temperature and the predicted temperature falls below the threshold amount.

18. The method of claim 12, wherein the threshold amount is 10° C.

19. The method of claim 12, wherein the temperature sensor is a thermocouple.

20. The method of claim 12, wherein the brake assembly is an electro-mechanical brake assembly.

* * * * *